US011725439B2

(12) United States Patent
Yun

(10) Patent No.: US 11,725,439 B2
(45) Date of Patent: Aug. 15, 2023

(54) STRUCTURE FOR PREVENTING MOVEMENT OF A SLIDING DOOR

(71) Applicants: Hyundai Motor Company, Seoul (KR); Kia Motors Corporation, Seoul (KR)

(72) Inventor: Hyung-In Yun, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 433 days.

(21) Appl. No.: 16/739,838

(22) Filed: Jan. 10, 2020

(65) Prior Publication Data

US 2021/0079703 A1    Mar. 18, 2021

(30) Foreign Application Priority Data

Sep. 16, 2019 (KR) .................. 10-2019-0113449

(51) Int. Cl.
  *E05D 15/06*  (2006.01)
  *B60J 5/06*   (2006.01)
  *E05D 15/30*  (2006.01)
  *E05D 15/10*  (2006.01)

(52) U.S. Cl.
  CPC ........... *E05D 15/0621* (2013.01); *B60J 5/06* (2013.01); *E05D 15/101* (2013.01); *E05D 15/30* (2013.01); *E05Y 2900/531* (2013.01)

(58) Field of Classification Search
  CPC ........... B60J 5/06; E05D 15/101; E05D 15/30
  See application file for complete search history.

(56) References Cited

U.S. PATENT DOCUMENTS

| 3,484,993 | A | * | 12/1969 | Erb | B60J 5/06 49/216 |
| 4,560,197 | A | * | 12/1985 | Minami | E05D 15/1047 49/213 |
| 5,507,119 | A | * | 4/1996 | Sumiya | E05F 15/635 49/218 |
| 9,022,455 | B2 | * | 5/2015 | Thiele | B60J 5/06 296/1.08 |
| 2010/0078961 | A1 | * | 4/2010 | Takaya | B60J 5/06 296/155 |
| 2011/0010998 | A1 | * | 1/2011 | Elliott | E05D 15/101 49/260 |

(Continued)

FOREIGN PATENT DOCUMENTS

KR       101684536 B1    12/2016
WO    WO 2020/109535    *  6/2020

*Primary Examiner* — Gregory J Strimbu
(74) *Attorney, Agent, or Firm* — Slater Matsil, LLP

(57) ABSTRACT

A structure includes a lower rail mounted to a lower portion of a vehicle body in a longitudinal direction of the vehicle body. A lower-rail roller part is rollably connected to the lower rail. A lower-rail swing arm is rotatably connected to the lower-rail roller part and a door. A lower guide rail is mounted to the door and defines a lower guide path in the longitudinal direction of the vehicle body. A lifter has a first end that moves along the lower guide path, and a second end that is fixed to the vehicle body. The lifter applies a force in a direction from the door toward the vehicle body. An upper guide rail is mounted to an upper portion of the vehicle body. An upper-guide roller part is mounted to the door to be seated in the upper guide rail.

17 Claims, 9 Drawing Sheets

(56) References Cited

U.S. PATENT DOCUMENTS

| | | | |
|---|---|---|---|
| 2011/0061306 A1* | 3/2011 | Hull, Jr. | E05D 15/10 |
| | | | 49/425 |
| 2015/0183303 A1* | 7/2015 | Choi | E05D 15/0621 |
| | | | 49/404 |
| 2016/0356069 A1 | 12/2016 | Choi et al. | |
| 2020/0149331 A1* | 5/2020 | Kiryu | E05D 15/0665 |

* cited by examiner

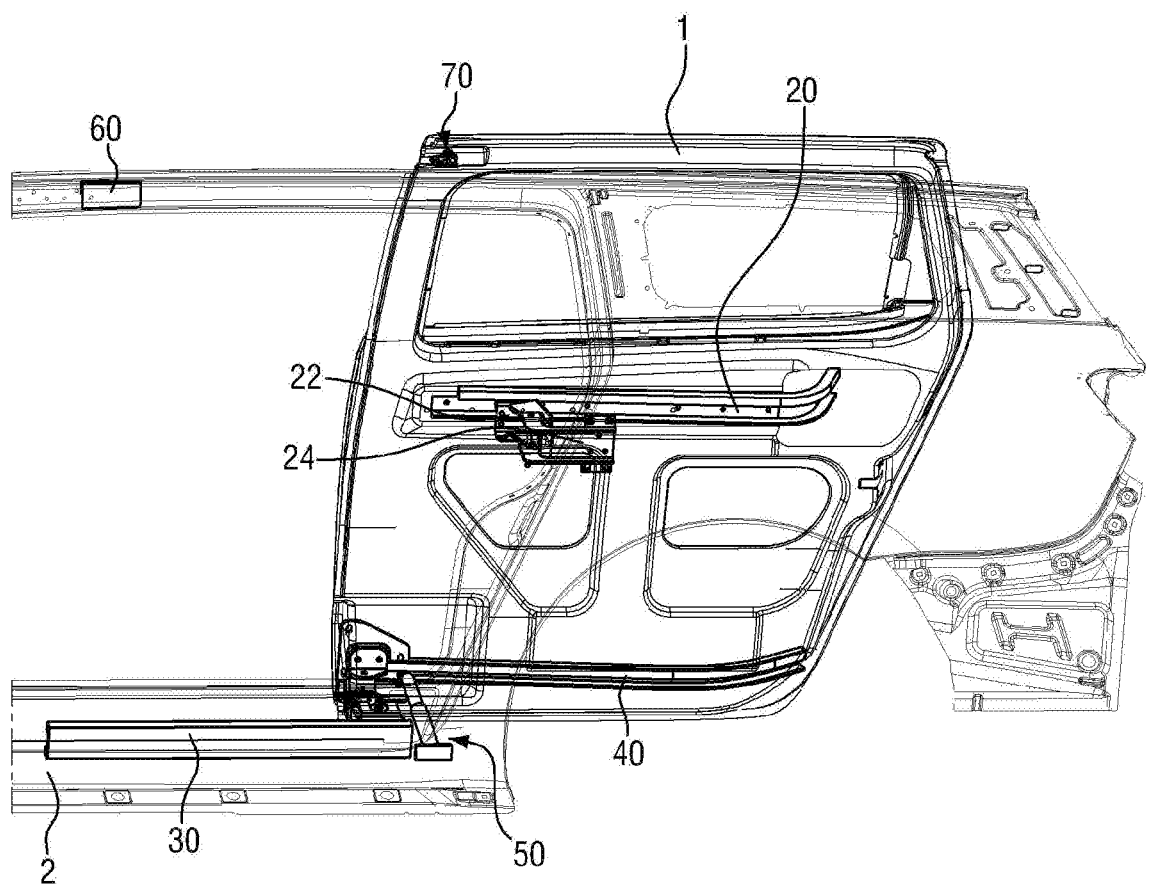

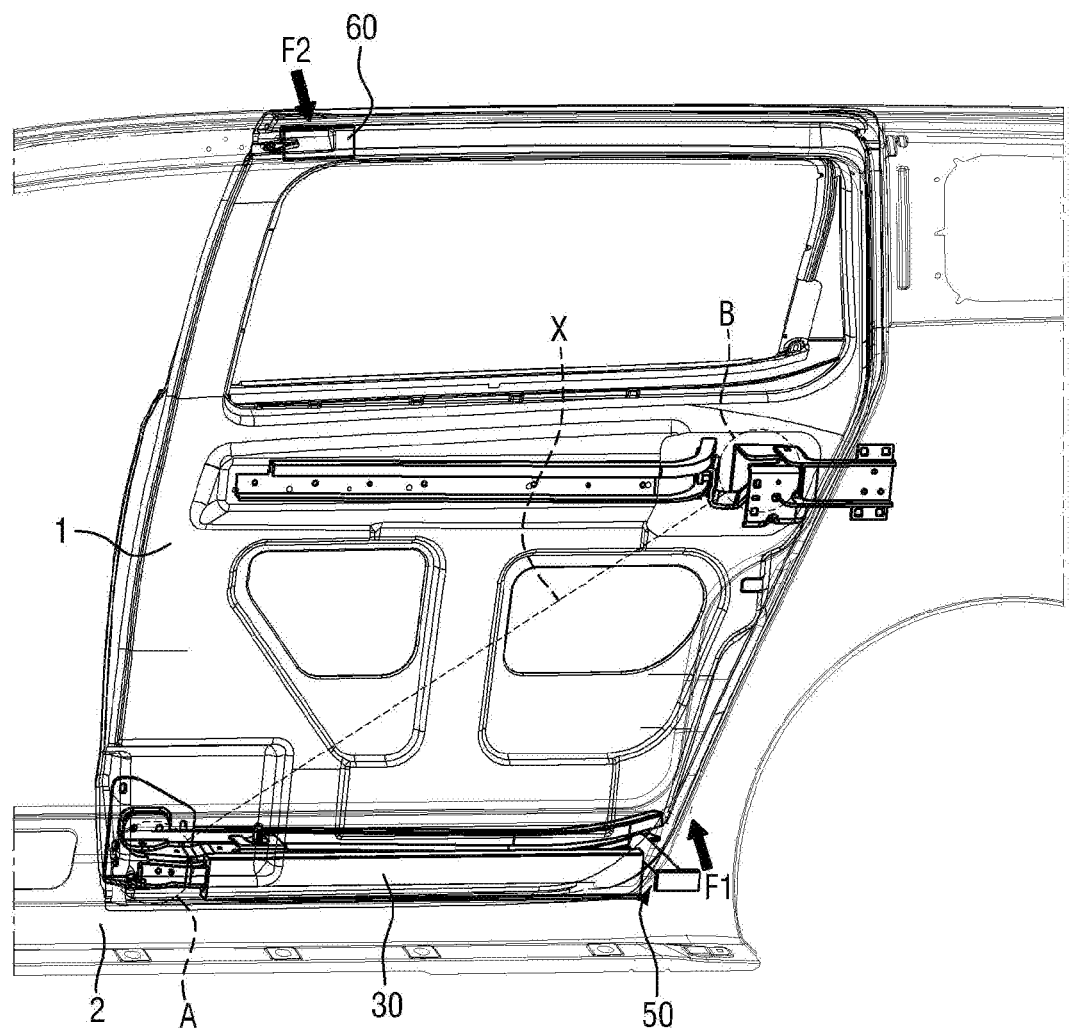

STRUCTURE FOR PREVENTING MOVEMENT OF A SLIDING DOOR

CROSS-REFERENCE TO RELATED APPLICATIONS

This application claims priority to Korean Patent Application No. 10-2019-0113449, filed in the Korean Intellectual Property Office on Sep. 16, 2019, which application is hereby incorporated herein by reference.

TECHNICAL FIELD

The present invention relates to a structure for preventing movement of an opposed type sliding door.

BACKGROUND

Generally, a vehicle has a vehicle compartment of a predetermined size to accommodate a driver or a passenger. A compartment door is mounted to a vehicle body to open or close the vehicle compartment.

A sliding type compartment door is provided with a front sliding door that is installed at a front position in a longitudinal direction of the vehicle, and a rear sliding door that is installed at a rear position in the longitudinal direction of the vehicle. The front sliding door and the rear sliding door are generally installed to be movable along a rail mounted on the vehicle body or the door.

The conventional sliding type door for opening or closing the vehicle compartment is problematic in that three rails (an upper rail, a center rail, and a lower rail) for supporting an upper portion, a central portion, and a lower portion of the door, respectively, when the door is opened or closed, and related components are required, so that the weight of the vehicle and the number of the components are increased, and the degree of freedom in designing the vehicle is lowered.

Thus, a two rail type door device for a vehicle is being developed to slidably support the sliding door only with a center rail and a lower rail. As an example of the related art, Korean Patent No. 10-1584536 (sliding door device for vehicle) is provided with a door rail (center rail) mounted to the sliding door and a vehicle-body rail mounted to a vehicle body, thus opening or closing the sliding door while a central slider coupled to the door rail and a lower slider coupled to the vehicle-body rail move.

However, referring to FIGS. 1 and 2, the conventional sliding structure is problematic in that two support points for supporting the sliding door, namely, a contact point A between the vehicle-body rail and the lower slider and a contact point B between the center rail and the central slider are formed in a vertical direction, so that the sliding door may be undesirably moved about a virtual axis X, connecting the contact points A and B to each other, in the direction of arrows shown in FIG. 2.

SUMMARY

The present invention relates to a structure for preventing movement of an opposed type sliding door. Particular embodiments of the invention relate to a structure capable of stably preventing the movement of the door in a state where the sliding door is closed in a sliding-door mounted vehicle having only a center rail and a lower rail.

Embodiments of the present invention have been made keeping in mind the above problems occurring in the related art. Embodiments can provide a novel structure capable of stably supporting a sliding door in a state where the sliding door is closed in a sliding-door mounted vehicle having only a center rail and a lower rail.

Embodiments of the present invention provide a structure for preventing movement of an opposed type sliding door. The structure includes a lower rail mounted to a lower portion of a vehicle body in a longitudinal direction thereof. A lower-rail roller part is rollably connected to the lower rail. A lower-rail swing arm is rotatably connected to the lower-rail roller part and the door. A lower guide rail is mounted to the door and defines a lower guide path in the longitudinal direction of the vehicle body. A lifter has a first end that comes into contact with the lower guide path, and a second end that is fixed to the vehicle body, and applies a force in a direction of pushing the lower guide rail. An upper guide rail is mounted to an upper portion of the vehicle body. An upper-guide roller part is mounted to the door to be seated in the upper guide rail, and prevents the door from being moved in a transverse direction of the vehicle body in a state where the upper-guide roller part is seated in the upper guide rail.

BRIEF DESCRIPTION OF THE DRAWINGS

FIG. 13 is a view illustrating a state where the sliding door of the vehicle equipped with the movement preventing structure of the opposed type sliding door according to the embodiment of the present invention is opened.

FIG. 14 is a view illustrating a state where the sliding door of the vehicle equipped with the movement preventing structure of the opposed type sliding door according to the embodiment of the present invention is closed.

DETAILED DESCRIPTION OF ILLUSTRATIVE EMBODIMENTS

Figure 1:
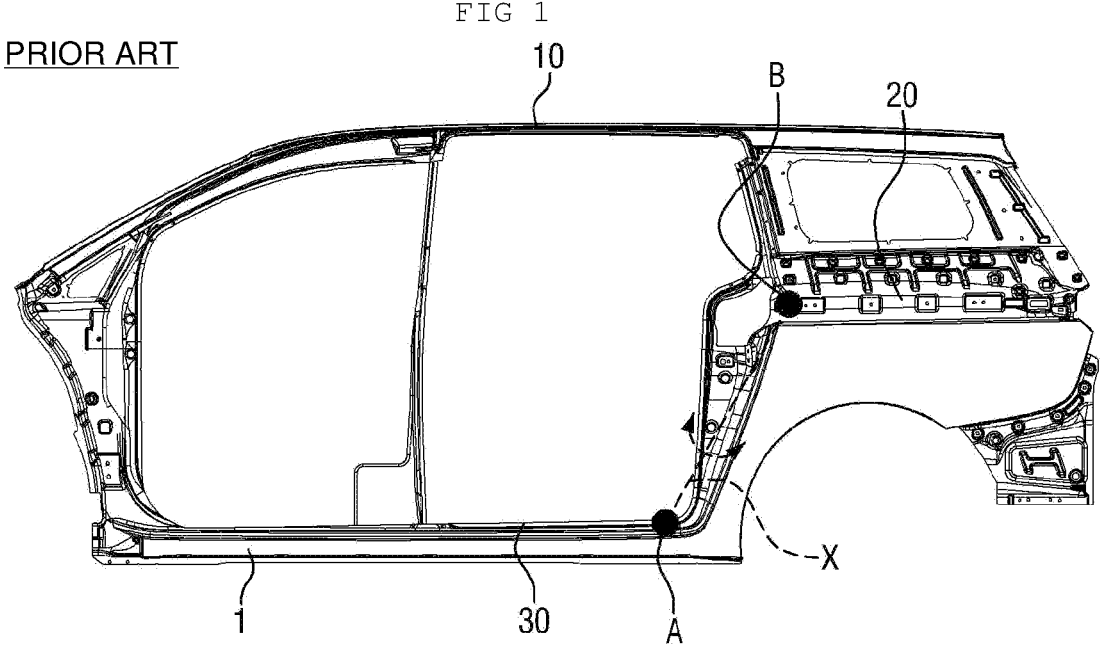
FIG. 1 is a view illustrating support points for supporting a sliding door of a vehicle having only a center rail and a lower rail according to the related art.
Figure 2:
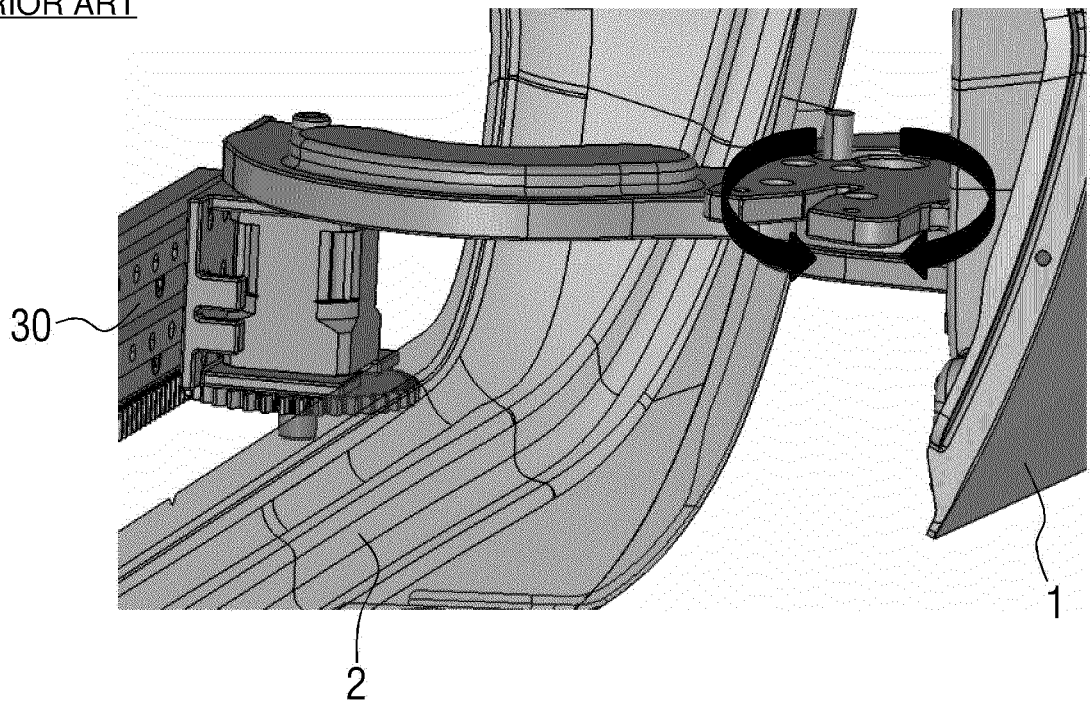
FIG. 2 is a view illustrating a state where the sliding door of FIG. 1 is moved.

Hereinafter, a structure for preventing movement of an opposed type sliding door according to preferred embodiments of the present invention will be described in detail with reference to the accompanying drawings. The terms or words used below should not be construed as being limited to the ordinary or dictionary meanings, and should be interpreted as meanings and concepts corresponding to the technical idea of the present invention on the basis of a principle wherein inventor(s) can properly define the concept of the terms in order to explain the invention in the best way.

According to an embodiment of the present invention, a vehicle has only a center rail 20 (rail formed on a central portion of the vehicle) and a lower rail 30 (rail formed on a lower portion of the vehicle), and has no upper rail 10 (rail formed on an upper portion of the vehicle). Here, the center rail 20 is formed on a sliding door 1, and the lower rail 30 is formed on a vehicle body 2.

The sliding door 1 is composed of a front door and a rear door. The movement preventing structure of the opposed type sliding door according to the embodiment of the present invention is applied to the lower rail 30 of the front door or the rear door. Therefore, since the movement preventing structure of the opposed type sliding door applied to each of the front door and the rear door has the same configuration and operating principle, a case where the movement preventing structure of the opposed type sliding door is applied to any one of the front door and the rear door will be described herein for the convenience of description.

Figure 3:
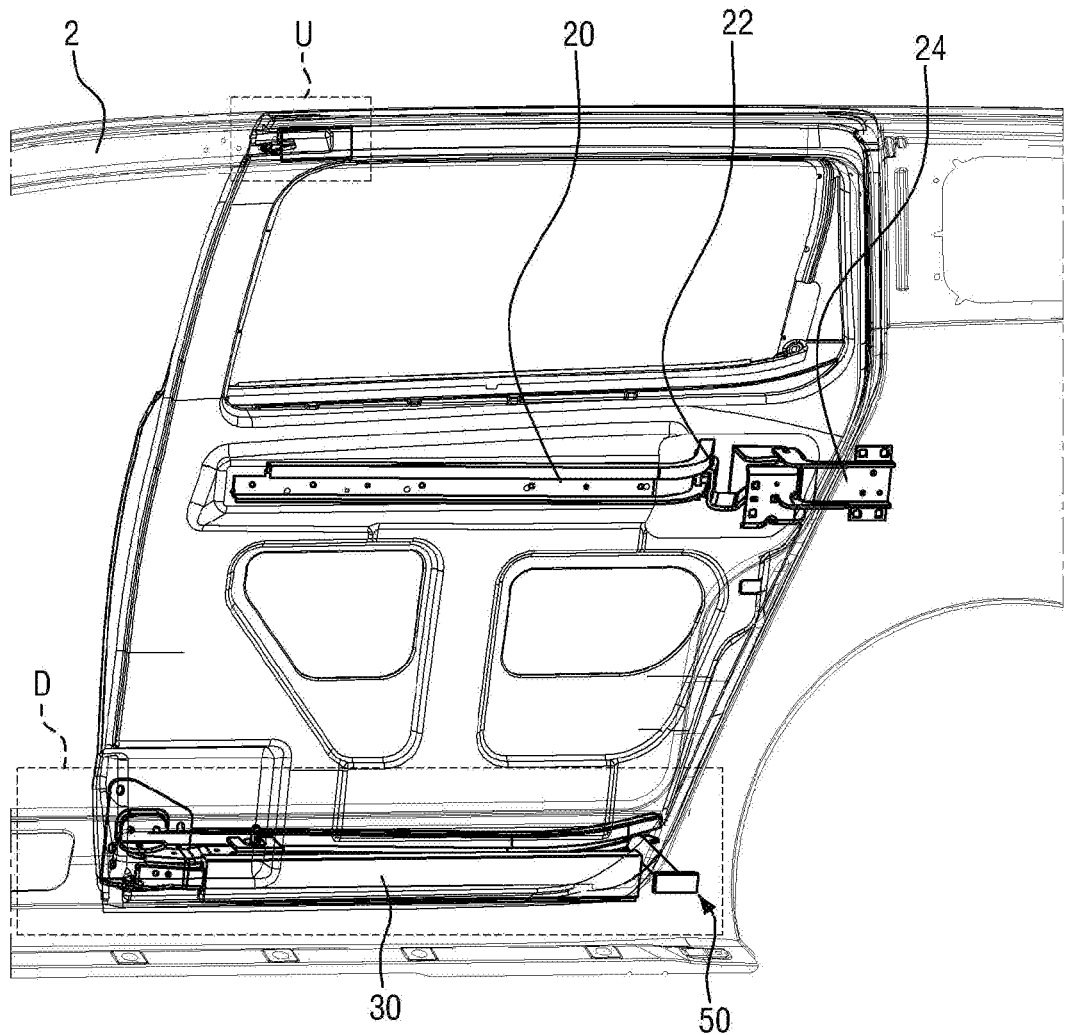
FIG. 3 is a view illustrating a state where a movement preventing structure of an opposed type sliding door according to an embodiment of the present invention is applied to each of an upper portion U and a lower portion D of a vehicle.

FIG. 3 is a view illustrating a state where the movement preventing structure of the opposed type sliding door according to the embodiment of the present invention is applied to each of the upper portion U and the lower portion D of the vehicle.

Referring to FIG. 3, the movement preventing structure of the opposed type sliding door according to the embodiment of the present invention is applied to each of the upper portion U and the lower portion D of the vehicle. Then, forces generated in opposite directions in the state where the sliding door 1 is closed act on the sliding door 1. The forces prevent the sliding door 1 from being moved.

The movement preventing structure of the opposed type sliding door according to the embodiment of the present invention includes a lower-rail roller part 32 located at the lower portion D of the vehicle, a lower-rail swing arm 34, a lower guide rail 40, a lifter 50, an upper guide rail 60 located at the upper portion U of the vehicle, and an upper-guide roller part 70.

Hereinafter, the configurations of the lower portion D and the upper portion U of the movement preventing structure of the opposed type sliding door will be described in sequence.

Figure 4:
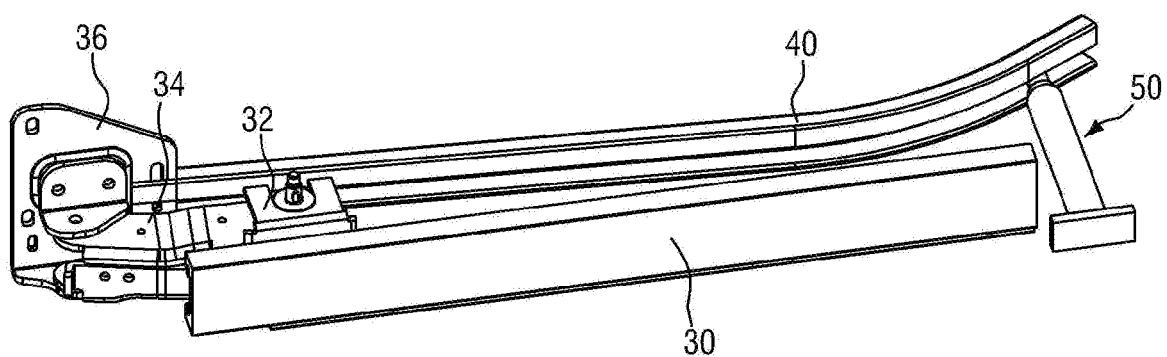
FIG. 4 is a view illustrating the movement preventing structure of the opposed type sliding door applied to the lower portion D of the vehicle.
Figure 5:
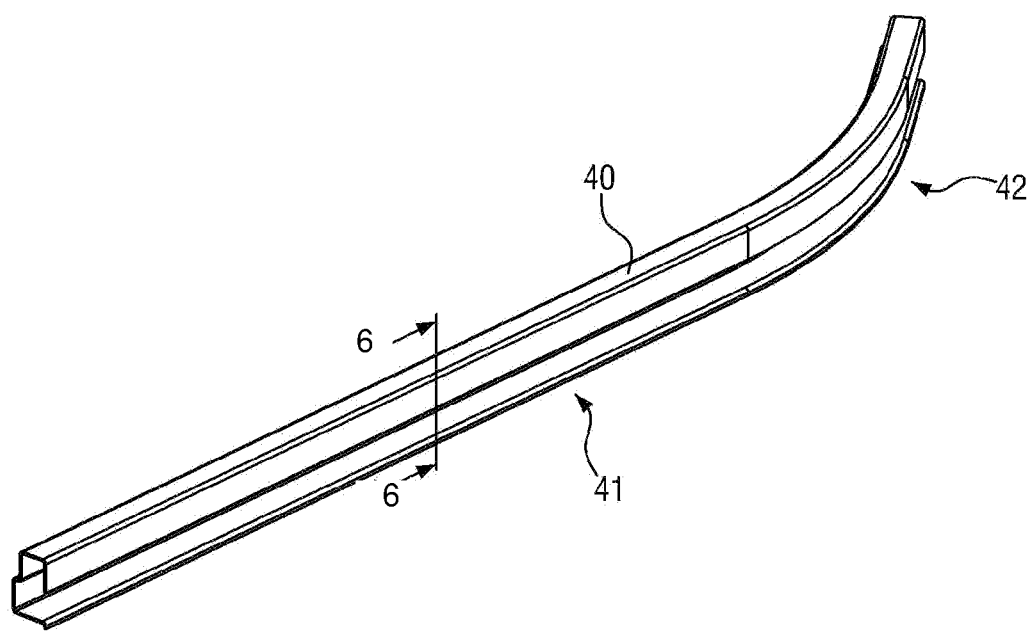
FIG. 5 is a view illustrating a lower guide rail according to the embodiment of the present invention.
Figure 6:
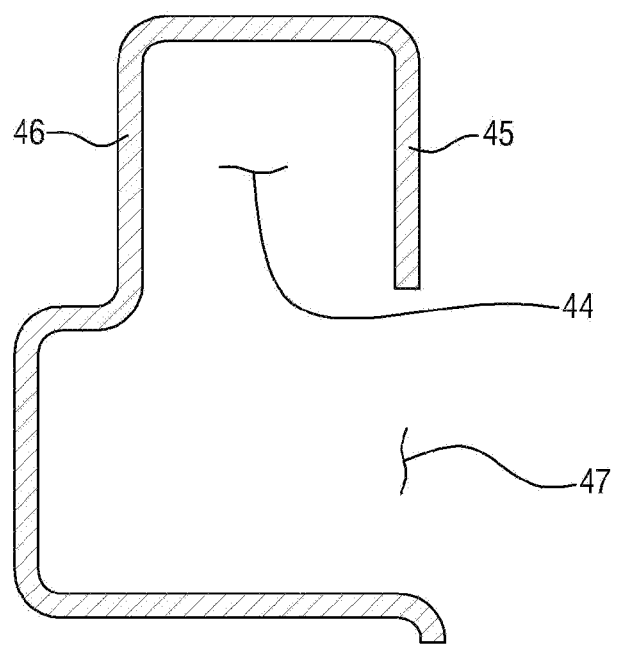
FIG. 6 is a sectional view taken along line 6-6 of FIG. 5.
Figure 7:
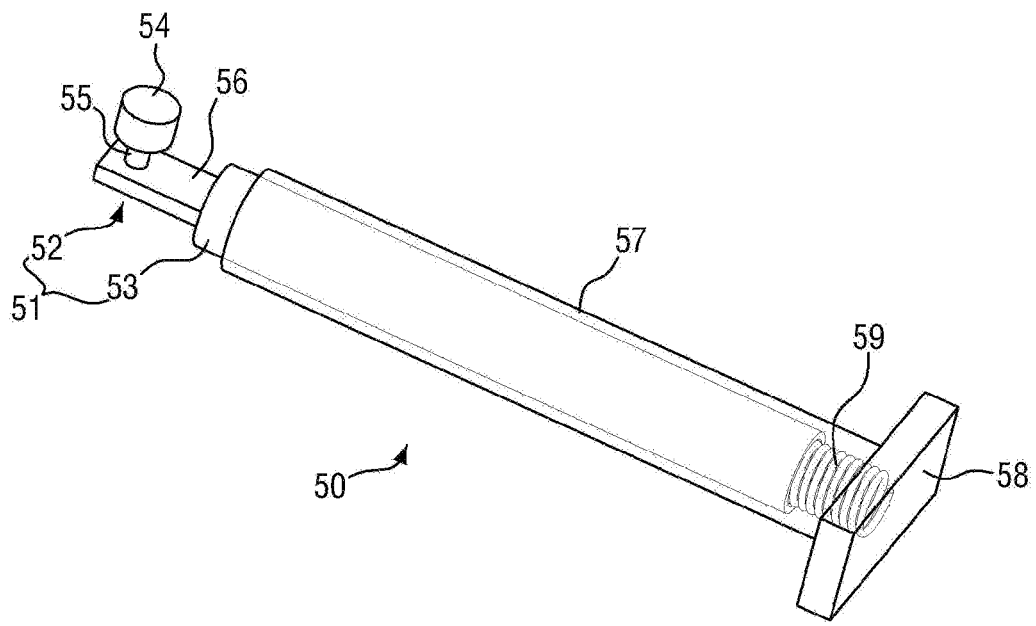
FIG. 7 is a view illustrating a lifter according to the embodiment of the present invention.

FIG. 4 is a view illustrating the movement preventing structure of the opposed type sliding door applied to the lower portion D of the vehicle, FIG. 5 is a view illustrating the lower guide rail according to the embodiment of the present invention, FIG. 6 is a sectional view taken along line 6-6 of FIG. 5, and FIG. 7 is a view illustrating the lifter according to the embodiment of the present invention.

Referring to FIG. 4, one end of the lower-rail roller part 32 is inserted into and rollably coupled to the lower rail 30 formed in a longitudinal direction of the vehicle body 2, and the lower-rail roller part 32 is guided by the lower rail 30 to move in the longitudinal direction of the vehicle.

One end of the lower-rail swing arm 34 is rotatably connected to a swing-arm mounting bracket 36 that is fixedly mounted to the inner surface of the door 1, while the other end is rotatably connected to the lower-rail roller part 32. Thus, if the door 1 moves, the lower-rail swing arm 34 may be rotatable about the lower-rail roller part 32, and be linearly movable along the lower rail 30.

Referring to FIGS. 4 and 5, the lower guide rail 40 includes a straight-shaped linear part 41 and a curve-shaped curved part 42, is formed long in the longitudinal direction of the vehicle body 2 such that one end thereof faces the swing-arm mounting bracket 36 and then is fixed to the door 1. According to the embodiment of the present invention, the lower guide rail 40 faces the lower rail 30. However, a position at which the lower guide rail 40 is mounted on the door 1 is not limited.

Referring to FIG. 6, a lower guide groove 44 is formed in the lower guide rail 40. The lower guide groove 44 is formed to protrude upwards, and first and second lower guide sidewalls 45 and 46 are formed on both sides of the lower guide groove 44. The first and second lower guide sidewalls 45 and 46 are formed in the transverse direction of the vehicle body 2. The second lower guide sidewall 46 extends and defines a lifter insert opening 47 with the first lower guide sidewall 45. The second lower guide sidewall 46 is connected to the door 1, and the lifter insert opening 47 faces the vehicle body 2. The lifter 50 is inserted through the lifter insert opening 47. The lower guide groove 44 extends in the longitudinal direction of the vehicle body 2 to define a lower guide path.

The lifter 50 is located between the lower guide rail 40 and the vehicle body 2 to support the door 1, and includes a movable part 51 and a fixed part 57.

Referring to FIG. 7, the movable part 51 includes a lower-guide roller part 52 and an insert part 53. Here, the lower-guide roller part 52 is connected to the lower guide rail 40, and the insert part 53 is connected to the fixed part 57.

The lower-guide roller part 52 includes a lower guide bearing 54, a bearing connection member 55, and a bearing support member 56. The lower guide bearing 54 is inserted into the lower guide groove 44, and is rotatably connected to the bearing connection member 55. The bearing connection member 55 is supported on a surface of the bearing support member 56. One end of the bearing support member 56 is connected to the insert part 53. The lower guide bearing 54 inserted into the lower guide groove 44 is rotatable while being in contact with the first and second lower guide sidewalls 45 and 46.

The insert part 53 has an approximately cylindrical shape to be movably inserted into an internal space of the fixed part 57. However, the shape of the insert part 53 is not limited.

The fixed part 57 has the internal space. An opening is formed in one end of the internal space so that the insert part 53 is inserted therein, and a closed end is formed on the other end to prevent the movement of the insert part 53. A lifter mounting bracket 58 is connected to the closed end of the fixed part 57. The lifter mounting bracket 58 is fixedly mounted on the vehicle body 2.

A spring 59 is located between the closed end of the fixed part 57 and the insert part 53 inserted into the internal space. The spring 59 allows the insert part 53 to be elastically movable in the internal space.

The lifter 50 according to the embodiment of the present invention is located at a side of the lower rail 30 to be opposite to the lower-rail swing arm 34. One end of the lifter 50 is rollably connected to the lower guide rail 40, and the mounting position of the lifter 50 is not limited as long as the other end is fixed to the vehicle body. But, the lifter 50 is preferably located at a side of the lower rail 30 to stably support the door 1.

Figure 8:
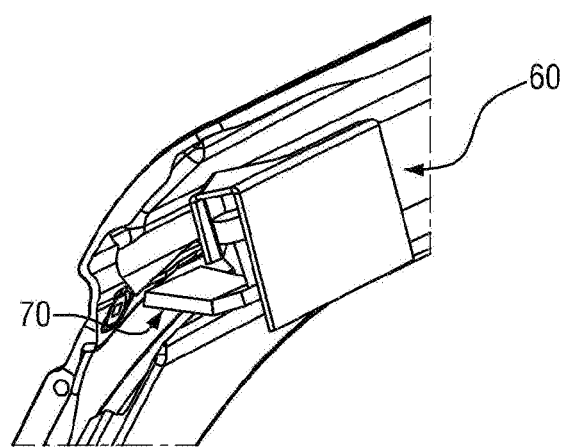
FIG. 8 is a view illustrating the movement preventing structure of the opposed type sliding door applied to the upper portion U of the vehicle.
Figure 9:
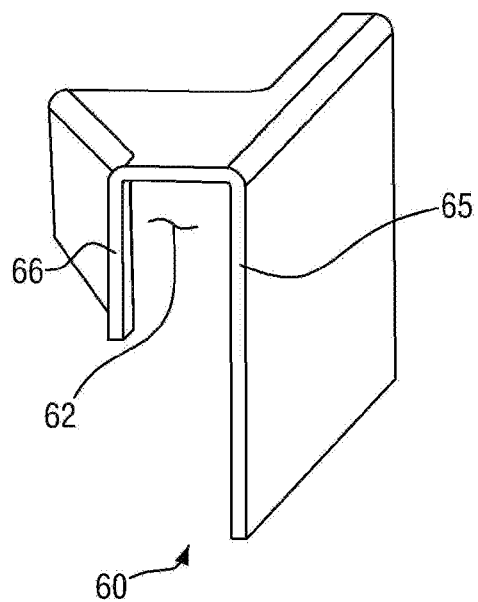
FIG. 9 is a view illustrating an upper guide rail according to the embodiment of the present invention.
Figure 10:
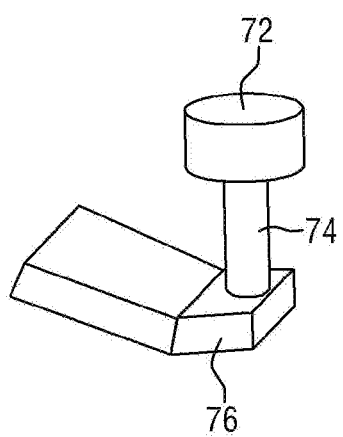
FIG. 10 is a view illustrating an upper-guide roller part according to the embodiment of the present invention.

FIG. 8 is a view illustrating the movement preventing structure of the opposed type sliding door applied to the upper portion U of the vehicle, FIG. 9 is a view illustrating the upper guide rail according to the embodiment of the present invention, and FIG. 10 is a view illustrating the upper-guide roller part according to the embodiment of the present invention.

Referring to FIG. 8, the upper guide rail 60 is mounted to the vehicle body 2, and the upper-guide roller part 70 is mounted to the door 1. To be more specific, the upper-guide roller part 70 is mounted to a side of the upper portion of the door 1 in the direction where the door 1 is closed, and the upper guide rail 60 is mounted to the vehicle body 2 while facing the upper-guide roller part 70 in the state where the door 1 is closed.

Referring to FIG. 9, an upper guide groove 62 is formed in the upper guide rail 6o. The upper guide groove 62 is formed to protrude upwards, and first and second upper guide sidewalls 65 and 66 are formed on both sides of the upper guide groove 62. Therefore, a lower opening is formed in the lower portion of the upper guide groove 62. The first and second upper guide sidewalls 65 and 66 are formed in the transverse direction of the vehicle body 2. The first upper guide sidewall 65 extends to be mounted to the vehicle body 2, and the second upper guide sidewall 66 guides the upper-guide roller part 70 through the lower end of the sidewall into the lower opening of the upper guide groove 62.

Figure 11:
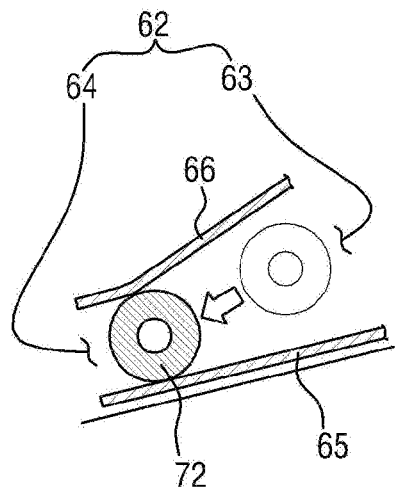
FIG. 11 is a view illustrating the upper guide roller inserted into the upper guide rail.

The upper guide groove 62 extends in the longitudinal direction of the vehicle body 2 to define an upper guide path. But, the upper guide path is formed only at a side of the upper portion of the door 1. The upper guide path is inclinedly formed to be tapered in the direction where the door 1 is closed. Referring to FIG. 11, the upper guide groove 62 includes a large groove 63, and a small groove 64 that becomes smaller and smaller from the large groove 63 in the direction where the door 1 is closed. In the embodiment of the present invention, the first upper guide sidewall 65 has the shape of a plane to be fixed to the vehicle body 2, and the second upper guide sidewall 66 has the shape of an inclined surface.

Referring to FIG. 10, the upper-guide roller part 70 includes an upper guide bearing 72, a bearing connection member 74, and a bearing support member 76. The upper guide bearing 72 is inserted into the upper guide groove 62, and is rotatably connected to the bearing connection member 74. The bearing connection member 74 is supported on a surface of the bearing support member 76. One end of the bearing support member 76 is connected to the door 1. The upper guide bearing 72 inserted into the upper guide groove 62 is rotatable while being in contact with the first and second upper guide sidewalls 65 and 66.

FIG. 11 is a view illustrating the upper guide roller inserted into the upper guide rail.

After the upper guide bearing 72 is seated in the large groove 63, it may be guided by the first and second upper guide sidewalls 65 and 66 to be movable towards the small groove 64. While the upper guide bearing 72 is seated in the large groove 63, the upper guide bearing 72 may come into contact with any one of the first and second upper guide sidewalls 65 and 66. If the upper guide bearing 72 is seated in the small groove 64, the upper guide bearing 72 almost comes into contact with both the first and second upper guide sidewalls 65 and 66.

Figure 12A:
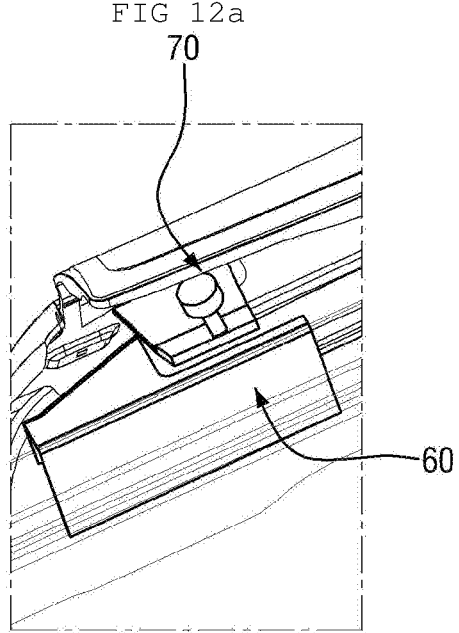
FIG. 12A illustrates an upper-guide roller part approaching the upper guide rail as the sliding door moves in a closure direction.
Figure 12B:
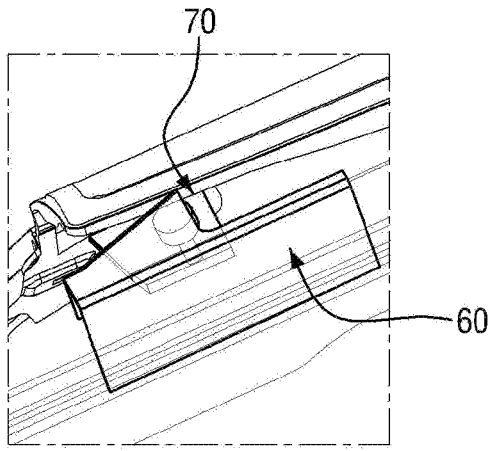
FIG. 12B illustrates an upper-guide roller part seated in the upper guide rail as the sliding door moves in a closure direction.
Figure 12C:
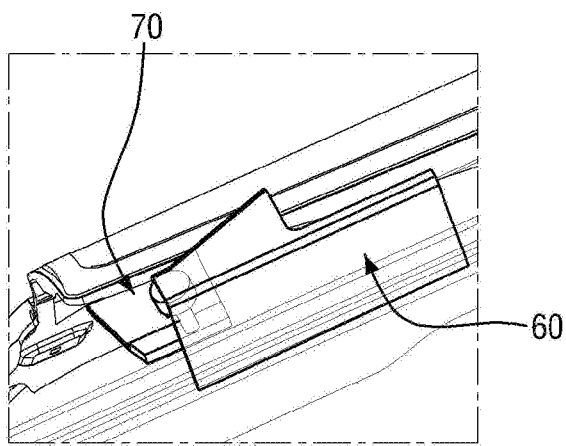
FIG. 12C illustrates an upper-guide roller part passing through the upper guide rail as the sliding door moves in a closure direction.

FIG. 12A illustrates an upper-guide roller part approaching the upper guide rail as the sliding door moves in a closure direction, FIG. 12B illustrates an upper-guide roller part seated in the upper guide rail as the sliding door moves in a closure direction, and FIG. 12C illustrates an upper-guide roller part passing through the upper guide rail as the sliding door moves in a closure direction.

If the door 1 moves in the closure direction, the upper-guide roller pall 70 comes near to the upper guide rail 6o and then moves towards the large groove 63 of the upper guide groove 62. Then, the upper guide bearing 72 is guided by the first and second upper guide sidewalls 65 and 66 to move to the upper small groove 64. The upper guide bearing 72 seated in the small groove 64 comes into contact with the first and second upper guide sidewalls 65 and 66, thus preventing the door 1 from being moved in the transverse direction of the vehicle body.

FIG. 13 is a view illustrating a state where the sliding door of the vehicle equipped with the movement preventing structure of the opposed type sliding door according to the embodiment of the present invention is opened, and FIG. 14 is a view illustrating a state where the sliding door of the vehicle equipped with the movement preventing structure of the opposed type sliding door according to the embodiment of the present invention is closed.

The door 1 moves from an open state in the closure direction and is stopped to take a closure state. Here, the vehicle body 2 is provided with a stopper (not shown), and the door 1 is provided with a stopper corresponding part (not shown). Generally, the stopper corresponding part (not shown) is formed to be inserted into the stopper (not shown). If the undesirable movement of the door 1 occurs in an area where the stopper (not shown) approaches the stopper corresponding part (not shown) while the door 1 is moved in the closure direction, the stopper corresponding part (not shown) is not inserted into the stopper (not shown) and consequently, the door 1 cannot be closed. Therefore, the movement preventing structure of the opposed type sliding door according to the embodiment of the present invention allows the door 1 to be stably closed.

Meanwhile, as described above, in the embodiment of the present invention, the center rail 20 is formed on the door 1, and a center roller part 22 is rollably connected to the center rail 20. The center roller part 22 is rotatably connected to a center-roller-part bracket 24 that is fixedly connected to the vehicle body 2.

Referring to FIG. 13, in the state where the door 1 is opened, the lifter 50 supports the lower guide rail 40 while being located at a side of the lower-rail swing arm 34. Since the lower-rail swing arm 34 is almost perpendicular to the lower rail 30 when the door 1 is opened, a distance between the door 1 and the vehicle body 2 is longest. Therefore, the movable part 51 of the lifter 50 is subjected to an elastic force of the spring 59 to protrude out of the fixed part 57 towards the lower guide rail 40.

If the door 1 moves in the closure direction, the lifter 50 is guided by the linear part 41 of the lower guide rail 40 to reach a point where it is to be guided by the curved part 42. Then, the lower-rail swing arm 34 rotates until it is parallel to the lower rail 30, and the movable part 51 of the lifter 50 is inserted into the fixed part 57 towards the door 1 while overcoming the elastic force of the spring 59.

Referring to FIG. 14, as the support point for supporting the door 1 in the state where the door 1 is closed, a contact point B of the center rail 20 with the center roller part 22, and a contact point A of the lower rail 30 with the lower-rail roller part 32 are formed. According to the related art, the door 1 may move about a virtual axis X connecting the contact point A with the contact point B.

According to the embodiment of the present invention, in the state where the door 1 is closed, a force F1 is generated in the lifter 50 in a direction from the door 1 towards the vehicle body 2, and a force F2 is generated in the upper-guide roller part 70 in a direction from the vehicle body 2 towards the door 1. Here, the force F1 is a force that is generated by the elastic force of the spring, and the force F2 is a force that is generated as reaction to the force F1. Therefore, since the force F1 and the force F2 act on positions on a diagonal line where the contact points A and B for supporting the door 1 cross the virtual axis X, the undesirable movement of the door 1 can be prevented when the door 1 is closed.

Meanwhile, according to another embodiment of the present invention, the movable part 51 of the lifter 50 may be moved not by the elastic force of the spring 59 but by a step motor (not shown). That is, a sensor unit (not shown) may sense a force acting on the lifter 50 to output a measured value, and a step motor (not shown) may rotate according to a measured value of the sensor unit (not shown) so that the movable part 51 may be inserted into or ejected out of the fixed part 57.

While the invention has been shown and described with reference to exemplary embodiments thereof, it will be understood by those skilled in the art that various changes in form and details may be made therein without departing from the spirit and scope of the invention as defined by the appended claims.

According to the present invention, the door can be stably closed by preventing the movement of the door through the force generated at the upper and lower portions of the door in the sliding door type vehicle having only the lower rail and the center rail.

Furthermore, according to the present invention, the sidewalls of the lower guide rail and the upper guide rail are formed in the L direction (the transverse direction of the vehicle body), and the door is prevented from being moved in the L direction through the roller inserted into each guide rail.

What is claimed is:

1. A structure for preventing movement of a sliding door, the structure comprising:
    a lower rail mounted to a lower portion of a vehicle body, wherein the lower rail extends in a longitudinal direction of the vehicle body;
    a lower-rail roller part rollably connected to the lower rail;
    a lower-rail swing arm rotatably connected to the lower-rail roller part and the sliding door;
    a lower guide rail mounted to the door and defining a lower guide path extending along the longitudinal direction of the vehicle body;
    a lifter having a first end and a second end, wherein the first end moves along the lower guide path as the door moves between an opened position and a closed position and the second end is fixed to the vehicle body, the lifter being configured to apply a force in a direction from the door toward the vehicle body;
    an upper guide rail mounted to an upper portion of the vehicle body; and
    an upper-guide roller part mounted to the door to be seated in the upper guide rail, the upper-guide roller part configured to prevent the door from being moved in a transverse direction of the vehicle body in a state where the upper-guide roller part is seated in the upper guide rail;
    wherein the lower guide rail comprises a lower guide groove extending along the lower guide path;
    wherein the first end of the lifter comprises a lower-guide roller part that is in rollable contact with an inner sidewall of the lower guide groove and comprises an insert part that is connected to the lower-guide roller part;
    wherein the second end of the lifter comprises a fixed part fixed to the vehicle body;
    wherein the fixed part has an internal space into which the insert part is inserted and a spring is provided in the internal space; and
    wherein the spring is configured to push the lower guide rail away from the vehicle body.

2. The structure of claim 1, wherein a portion of the lifter is positioned on a side of the lower rail that faces the lower-rail swing arm.

3. The structure of claim 1, wherein a portion of the door to which the upper-guide roller part is mounted extends parallel to the longitudinal direction of the vehicle body, and wherein the upper guide rail faces the upper-guide roller part in a state where the door is closed.

4. The structure of claim 1, wherein the upper guide rail comprises an upper guide groove defining an upper guide path extending along the longitudinal direction of the vehicle body, and wherein sidewalls of the upper guide groove extend generally parallel to the longitudinal direction of the vehicle body.

5. The structure of claim 4, wherein the upper-guide roller part is in rollable contact with inner sides of the sidewalls of the upper guide groove.

6. The structure of claim 1, further comprising a center rail positioned in a central portion of the door and a center-rail roller part connected to the center rail, wherein, in a state where the door is closed, the movement of the door is prevented by a support force generated by contact of the center rail with the center-rail roller part and contact of the lower rail with the lower-rail roller part, a force applied by the lifter, and a force applied by the upper-guide roller part direction from the door towards the vehicle body.

7. A vehicle comprising:
    a vehicle body;
    a sliding door;
    a lower rail mounted to a lower portion of the vehicle body, wherein the lower rail extends in a longitudinal direction of the vehicle body;
    a lower-rail roller part rollably connected to the lower rail;
    a lower-rail swing arm rotatably connected to the lower-rail roller part and the sliding door;
    a lower guide rail mounted to the sliding door and defining a lower guide path extending along the longitudinal direction of the vehicle body;
    a lifter having a first end that moves along the lower guide path as the door moves between an opened position and a closed position and a second end that is fixed to the vehicle body, the lifter configured to apply a force in a direction from the door toward the vehicle body;
    an upper guide rail mounted to an upper portion of the vehicle body; and
    an upper-guide roller part mounted to the door to be seated in the upper guide rail, the upper-guide roller part configured to prevent the door from being moved in a transverse direction of the vehicle body in a state where the upper-guide roller part is seated in the upper guide rail;

wherein the lower guide rail comprises a lower guide groove extending along the lower guide path;

wherein the first end of the lifter comprises a lower-guide roller part that is in rollable contact with an inner sidewall of the lower guide groove and comprises an insert part that is connected to the lower-guide roller part;

wherein the second end of the lifter comprises a fixed part fixed to the vehicle body;

wherein the fixed part has an internal space into which the insert part is inserted and a spring is provided in the internal space; and wherein the spring pushes the lower guide rail away from the vehicle body.

8. The vehicle of claim 7, wherein a portion of the lifter is positioned on a side of the lower rail that faces the lower-rail swing arm.

9. The vehicle of claim 7, wherein a portion of the door to which the upper-guide roller part is mounted extends parallel to the longitudinal direction of the vehicle body, and wherein the upper guide rail faces the upper-guide roller part in a state where the door is closed.

10. The vehicle of claim 7, wherein the upper guide rail comprises an upper guide groove defining an upper guide path extending along the longitudinal direction of the vehicle body, and wherein sidewalls of the upper guide groove extend generally parallel to the longitudinal transverse direction of the vehicle body.

11. The vehicle of claim 10, wherein the upper-guide roller part is in rollable contact with inner sides of the sidewalls of the upper guide groove.

12. A structure for preventing movement of a sliding door, the structure comprising:
a lower rail mounted to a lower portion of a vehicle body, wherein the lower rail extends along a longitudinal direction of the vehicle body;
a lower-rail roller part rollably connected to the lower rail;
a lower-rail swing arm rotatably connected to the lower-rail roller part and the sliding door;
a lower guide rail mounted to the door and defining a lower guide path extending along the longitudinal direction of the vehicle body;
a lifter having a first end and a second end, wherein the first end moves along the lower guide path as the door moves between an opened position and a closed position and the second end is fixed to the vehicle body, the lifter being configured to apply a force in a direction from the door toward the vehicle body;
a lifter mounting bracket connected to and between the second end of the lifter and the vehicle body;
an upper guide rail mounted to an upper portion of the vehicle body; and
an upper-guide roller part mounted to the door to be seated in the upper guide rail, the upper-guide roller part configured to prevent the door from being moved in a transverse direction of the vehicle body in a state where the upper-guide roller part is seated in the upper guide rail;

wherein the lower guide rail comprises a lower guide groove extending along the lower guide path;

wherein the first end of the lifter comprises a lower-guide roller part that is in rollable contact with an inner sidewall of the lower guide groove and comprises an insert part that is connected to the lower-guide roller part;

wherein the second end of the lifter comprises a fixed part fixed to the vehicle body;

wherein the fixed part has an internal space into which the insert part is inserted and a spring is provided in the internal space; and wherein the spring is configured to push the lower guide rail away from the vehicle body.

13. The structure of claim 12, wherein a portion of the lifter is positioned on a side of the lower rail that faces the lower-rail swing arm.

14. The structure of claim 12, wherein a portion of the door to which the upper-guide roller part is mounted extends parallel to the longitudinal direction of the vehicle body and wherein the upper guide rail faces the upper-guide roller part in a state where the door is closed.

15. The structure of claim 12, wherein the upper guide rail comprises an upper guide groove defining an upper guide path extending along the longitudinal direction of the vehicle body, and wherein sidewalls of the upper guide groove extend generally parallel to the longitudinal direction of the vehicle body.

16. The structure of claim 15, wherein the upper-guide roller part is in rollable contact with inner sides of the sidewalls of the upper guide groove.

17. The structure of claim 12, further comprising a center rail positioned on a central portion of the door and a center-rail roller part connected to the center rail, wherein, in a state where the door is closed, the movement of the door is prevented by a support force generated by contact of the center rail with the center-rail roller part and contact of the lower rail with the lower-rail roller part, a force applied by the lifter, and a force applied by the upper-guide roller part.

* * * * *

UNITED STATES PATENT AND TRADEMARK OFFICE
CERTIFICATE OF CORRECTION

PATENT NO. : 11,725,439 B2
APPLICATION NO. : 16/739838
DATED : August 15, 2023
INVENTOR(S) : Hyung-In Yun It is certified that error appears in the above-identified patent and that said Letters Patent is hereby corrected as shown below:

In the Claims

In Column 8, in Claim 3, Line 24, delete "body," and insert -- body --.

In Column 8, in Claim 6, Line 38, delete "positioned in" and insert -- positioned on --.

In Column 8, in Claim 6, Lines 44-45, delete "part direction from the door towards the vehicle body." and insert -- part. --.

In Column 9, in Claim 10, Lines 30-31, after "longitudinal" delete "transverse".

Signed and Sealed this
Fourteenth Day of November, 2023

Katherine Kelly Vidal
*Director of the United States Patent and Trademark Office*